United States Patent
Kirby

[15] 3,635,500
[45] Jan. 18, 1972

[54] UNDERGROUND DRIVE COUPLING

[72] Inventor: Edward J. Kirby, Manhattan Beach, Calif.

[73] Assignee: Torrance Tubing Division of Cyprus Mines Corporation, Torrance, Calif.

[22] Filed: Apr. 3, 1970

[21] Appl. No.: 25,380

[52] U.S. Cl. .................. 285/115, 285/175, 285/333
[51] Int. Cl. ........................................... F16l 21/00
[58] Field of Search .......... 61/72.7; 285/115, 333, 175, 285/390, 334

[56] References Cited

UNITED STATES PATENTS

| 2,122,757 | 7/1938 | Scott | 285/334 |
| 2,051,499 | 8/1936 | Siegle | 285/333 |
| 2,494,128 | 1/1950 | Holmquist et al. | 285/390 X |
| 3,083,043 | 3/1963 | Thornhill | 285/333 |
| 1,894,446 | 1/1933 | McKenny | 61/72.7 X |
| 191,768 | 6/1877 | Matheson | 285/115 |
| 2,027,063 | 1/1936 | Reifel | 61/72.7 X |
| 1,933,749 | 11/1933 | Murray | 285/115 |

FOREIGN PATENTS OR APPLICATIONS

| 11,725 | 1902 | Great Britain | 285/115 |

Primary Examiner—Thomas F. Callaghan
Attorney—Beehler & Arant

[57] ABSTRACT

A drive coupling forming a connection for adjacent sections of pipe while the pipe is being simultaneously rotated and driven in a horizontal attitude a few feet below ground level. The coupling is provided with a flange to absorb bending stress at the end of the pipe to prevent deformation of the pipe end within the coupling. The flange engages the pipe where the pipe wall is unthreaded and at maximum thickness.

3 Claims, 3 Drawing Figures

PATENTED JAN 18 1972
3,635,500
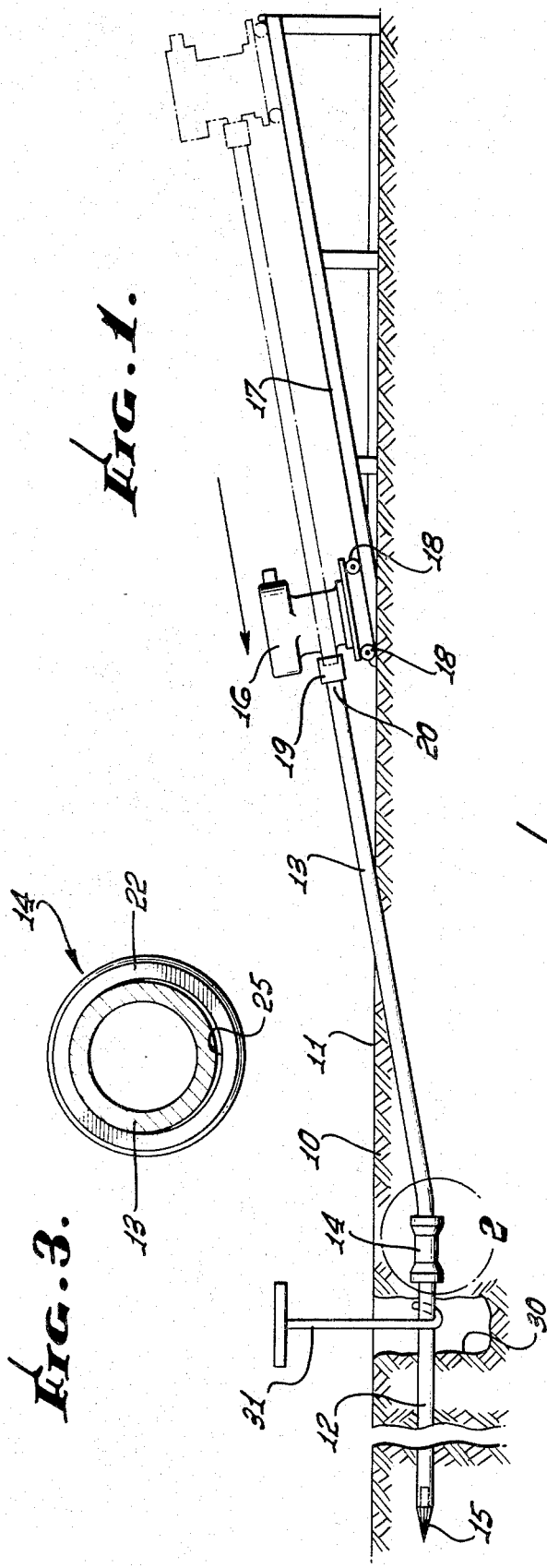
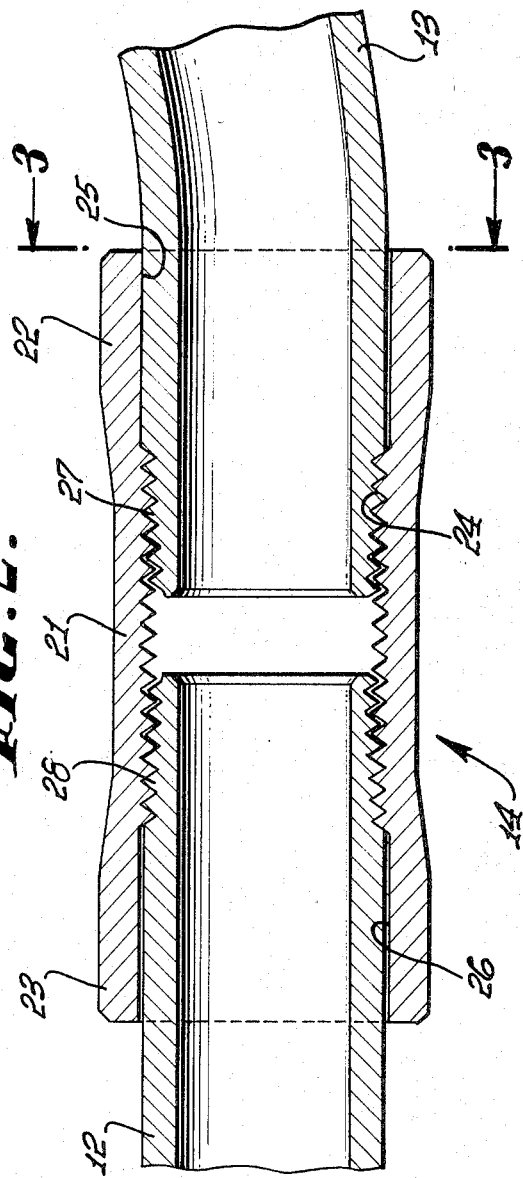
INVENTOR.
EDWARD J. KIRBY
BY Beehler & Arant
ATTORNEYS.

UNDERGROUND DRIVE COUPLING

There has been put into practice a method of laying pipe and conduit underground which is termed direct drilling. By this method, without making use of an excavated pipe trench, the pipe or conduit is driven into the ground at an angle of about 10° from horizontal. A bit at the advancing end of the lead pipe section bores its way through the ground as the pipe section is rotated while being driven into the ground by a suitable driving force.

Customarily such pipelines may be for services such as electricity, water, or gas. The object is to run the pipe at a horizontal location between about 1 to 3 feet below the surface. Although the leading pipe section is drilled into the ground angularly relative to horizontal, the horizontal orientation is achieved by sinking post holes at horizontal intervals of about 6 feet along the pipeline. When a pipe section breaks into a post hole an operator with a hook can reorient the pipe section to a horizontal attitude should it enter a post hole in a tilted up, down or sideways position.

To progressively advance the operation, after each length of pipe section has been drilled into the ground, the driving force is uncoupled and backed off, then a new pipe section is coupled to the section already in the ground, the driving force is recoupled to the new pipe section, and drilling is then continued until the new section also has been drilled for its length into the ground, whereafter still another section is added. Pipe lines exceeding 1,000 feet are frequently driven by this operation in a single machine setup. Tree roots and comparable yieldable obstructions are frequently successfully penetrated without damage to the pipeline.

In the electrical industry such pipe is commonly known as rigid conduit and conduit for the drilling method referred to above is identified as hard conduit.

In spite of a careful selection of conduit material having desirable properties, difficulties are experienced. The electrical industry, for example, makes use of coupling sleeves with parallel or straight-through threads which receive a tapered male thread on the pipe section. The male thread is threaded into the coupling sleeve until the last thread joins on the coupling or until contiguous tapered ends of pipe sections abut in the coupling.

In the practice described the innermost threads do not fit snugly in the threads of the sleeve, hence these threads are free to roll as the pipe section is simultaneously rotated and thrust into the ground. What frequently results is that the conduit may break at the weakest place, namely where the threads abut into the thickness of the conduit well.

An even worse condition is often created within the coupling sleeve where endmost portions of the threaded ends are swaged radially inwardly. Then when electric cable is pulled through the conduit during installation, insulation frequently is scraped off by the ragged swaged part causing a potential short circuit. Comparable breaking and swaging action occurs in other pipelines as well when laid in this fashion, whether they be for water, gas or electricity and whether or not the threads in the coupling sleeve be straight or tapered.

It is therefore among the objects of the invention to provide a new and improved coupling for use in the direct drilling method of laying pipe which will inhibit breaking and swaging of pipe sections.

Another object of the invention is to provide a new and improved coupled pipeline for laying by the direct drilling method which will avoid the difficulties heretofore experienced.

Still another object of the invention is to provide a new and improved pipe or conduit connection which will concentrate stresses generated while laying a pipeline by the direct drilling method to portions of pipe or conduit sections which are best able to absorb the stresses.

With these and other objects in view, the invention consists in the construction, arrangement, and combination of the various parts of the device whereby the objects contemplated are attained, as hereinafter set forth, pointed out in the appended claims and illustrated in the accompanying drawings.

In the drawings:

FIG. 1 is a longitudinal elevational view of a pipeline being laid underground by the direct drilling method.

FIG. 2 is a longitudinal sectional view of a connection between adjacent ends of pipe sections, taken at the location 2 of FIG. 1.

FIG. 3 is a cross-sectional view on the line 3—3 of FIG. 2.

In an embodiment of the invention chosen for the purpose of illustration, there is shown a pipeline being driven in the ground 10 below ground level 11 along a selected path.

A leading pipe section 12, which has achieved a substantially horizontal position, is connected to a trailing pipe section 13 by means of a coupling sleeve 14.

At the forward or leading end of the leading pipe section 12 is a bit 15 of substantially conventional construction which when rotated is such that it cuts a hole through the ground 10 into which the pipeline is thrust.

A suitable power actuated driver 16 is mounted on a ramp 17, the ramp being longer than an individual pipe section and pitched at about 10° from the level of the ground surface 11. Wheels 18 ease travel of the driver up and down the ramp. At the forward side of the driver 16 is a chuck 19 to which the trailing ends 20 of successive pipe sections are attached.

In the chosen embodiment the coupling sleeve 14 has a central section 21 of diameter relatively smaller than respective end sections or skirts 22 and 23. A bore 24 through the coupling sleeve is threaded with a straight or parallel thread throughout the central section but the bore terminates at one end in an unthreaded band 25 and at the other end in an unthreaded band 26. It is significant that the diameters of the unthreaded bands 25 and 26 are slightly greater than the root diameter of the threads of the coupling sleeve.

In the chosen embodiment the pipe section 13 is provided with a tapered male thread 27, the taper being substantially a 3° standard taper. Of further significance is the fact that the length of the tapered male thread is no greater than about one-half the length of the female thread within the bore 24 or, in any event, less than one-half the length of the coupling sleeve. A male thread 28 on the pipe section 12 is similar. Constructed as described, when the connection is made up as shown in FIG. 2, the smooth exterior of the pipe section adjacent the tapered male thread, in each instance, lies within the unthreaded band of the respective end section of the coupling sleeve.

When a pipeline is to be driven the bit 15 is fastened to the leading pipe section 12 and the pipe section is mounted in the chuck 19 of the driver 16 and the driver 16 moved to the high end of the ramp 17 as shown by the broken line position of FIG. 1. After the pipe section has been driven into the ground until it protrudes into the first post hole 30, an operation making use of a hook 31 forces the pipe section upwardly into a substantially horizontal position.

The driver 16 meanwhile has travelled down the ramp 17 to the solid line position, the chuck 19 being rotated during the course of travel to rotate the pipe section and the bit 15. The chuck is then released, and the trailing pipe section 13 is connected to the leading pipe section 12 by means of the coupling sleeve 14. The driver 16 at this stage of operation being again at the top of the ramp is coupled to the trailing pipe section by means of the chuck 19 and the driving operation is started again.

Since the pipeline will be forced into an arc as the leading pipe section is pulled to a horizontal position, the leverage action about the threaded junction as a fulcrum tends to force the smooth surfaced wall of the pipe section, namely the part of greatest thickness, against the unthreaded band of the respective end section and, since these parts are those absorbing maximum stress, as the pipe section is rotated, prospect of breakage of the pipe section is minimized by transfer of the stress to the unthreaded portion of the pipe section.

Simultaneously pressure is relieved at the small end of the tapered male thread, thereby to avoid swagging over this part of the pipe section where the strength is at a minimum.

Although a parallel thread in the coupling sleeve has been used for purpose of illustration, it will be appreciated that a tapered thread in the sleeve will be comparably effective.

As the connection assumes a horizontal position in the course of its travel underground stresses may be relieved but, should there be a shift in alignment for any reason, the stresses will be again absorbed as described. This occurs particularly as successive pipe sections are added one by one, until the entire pipeline has been laid.

What is claimed is:

1. A coupled pipeline subject to being rotated while being driven through the ground below ground surface comprising a leading pipe section, a trailing pipe section, and a coupling interconnecting said pipe sections, said coupling comprising a cylindrical wall having a bore therethrough, said bore being threaded for a portion of its length intermediate opposite ends, and an unthreaded band extending the full distance between each end and the adjacent end of the threaded portion, the wall at each end section of the unthreaded band having an inside diameter greater than the root diameter of the threads, the wall thickness of the wall at the unthreaded band being at least as great as the thickness of the wall at the threaded portion between the exterior and the roots of the threads, each pipe section having a tapered thread at the end extending lengthwise for a distance less than one-half the length of the coupling whereby a smooth exterior circumference of the pipe section lies adjacent the unthreaded band, said section having the tapered thread of a length less than the length of said unthreaded band whereby the potential engagement of the unthreaded band with the unthreaded exterior of the pipe section is of a length exceeding the length of the tapered thread said unthreaded band having an inside diameter greater than the outside diameter of said unthreaded exterior of the pipe section so as to provide a clearance therebetween to allow for angular disposition of the pipe section relative to the coupling.

2. A coupled pipeline as in claim 1 wherein the threaded portion within the coupling comprises straight threads.

3. A coupled pipeline as in claim 1 wherein the wall throughout the entire length of each end section of the unthreaded band has an outside diameter greater than the outside diameter of a section surrounding the threaded portion.

* * * * *